United States Patent Office 2,920,058
Patented Jan. 5, 1960

2,920,058
COMPOSITION CONSISTING ESSENTIALLY OF THE RESINOUS REACTION PRODUCT OF AN ESTERIFIED PHENOL-ALDEHYDE RESIN AND A SILICONE RESIN

Lawrence H. Brown, Midland, Mich., assignor to Dow Corning Corporation, Midland, Mich., a corporation of Michigan No Drawing. Application January 14, 1955
Serial No. 481,968
5 Claims. (Cl. 260—43)

This invention relates to novel resins which are condensation products of certain organosilicon compounds and etherified phenol-aldehyde resins.

The primary object of this invention is to produce novel resinous compositions having resistance to water deterioration and weathering as well as thermal stability to a degree heretofore unobtainable with the phenol-aldehyde resins employed herein. Another object is to provide new resins as coating materials in paints and varnishes. Other objects and advantages obtained through this invention are detailed in or will be apparent from the following specification and appended claims.

In accordance with this invention a novel resinous composition is prepared consisting essentially of the reaction product of (A) 1 to 99 percent by weight of the condensation product of (1) a low molecular weight phenol-aldehyde resin containing from 3-8 phenolic nuclei and (2) an alkylene oxide and (B) 1 to 99 percent by weight of an organosilicon compound of the formula $$R_nSiX_mO_{\frac{4-(m+n)}{2}}$$

wherein R is a radical selected from the group consisting of monovalent hydrocarbon radicals, and halogenated monovalent hydrocarbon radicals, X is selected from the group consisting of hydrocarbonoxy groups, hydroxyl radicals and halogen atoms, $n$ has an average value of from .9 to 3 inclusive, $m$ has an average value of from .05 to 3.1 inclusive, and the sum $m+n$ does not exceed 4.

The resinous condensation product (A) operable in this invention can be prepared by reacting (1) a low molecular weight phenol-aldehyde resin with (2) an alkylene oxide. The phenol-aldehyde resins, (1) supra, are well known in the art. Such resins are condensation products of any phenol such as p-cresol, o-cresol, m-cresol, 3-5 xylenol, 2-4 xylenol, p-phenylphenol, p-ter-butylphenol, p-ter-amylphenol, p-sec-octylphenol, p-hydroxydiphenyl, thymol, carvacrol, and α-naphthol, with any aldehyde such as formaldehyde, acetaldehyde, glyoxal, furfural, and α-hydroxyadipaldehyde.

The phenol-aldehyde resin can be prepared by any of the well-known methods. Acid or alkaline catalyzed condensation reactions of phenols and aldehydes are well documented in the art [e.g., Granger, F. S., "Condensation of Phenols with Formaldehyde," Ind. Eng. Chem., vol 24, 442 (1932), and vol. 29, pages 860 ff., 1125 ff., and 1305 ff. (1937)].

It is preferred that the phenol-aldehyde resins be acetone soluble and in no event should they be advanced to the "C" stage or resite stage. The phenol-aldehyde resin should thus be a low-molecular weight resin containing preferably from 3 to 8 phenolic nuclei per molecule and probably having the formula, for example,

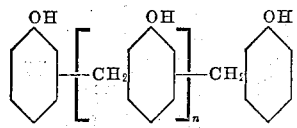

wherein $n$ is an integer from 1 to 6 inclusive.

The phenol-aldehyde resin is reacted with any alkylene oxide such as ethylene oxide, propylene oxide, styrene oxide, etc., to produce resins such as, for example, the type having the formula,

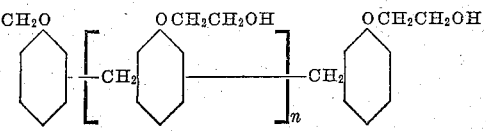

wherein $n$ has an average value exceeding 3. This type of reaction is well known in the art.

The phenol-aldehyde-alkylene oxide reaction product can be further modified with any monocarboxylic acid or combination of such acids. Specific examples which are illustrative of the carboxylic acids operative herein include acetic acid, propionic acid, acrylic acid, stearic acid, 2-ethyl-hexoic acid, caproic acid, caprylic acid, capric acid, lauric acid, myristic acid, palmetic acid, arachidic acid, behenic acid, lignoceric acid, lauroleic acid, myristoleic acid, palmitoleic acid, oleic acid, gadoleic acid, erucic acid, ricinoleic acid, linoleic acid, linoleneic acid, elaeostearic acid, licanc acid, arachidonic acid, clupanodonic acid. Monocarboxylic acids are found in and employed as linseed oil fatty acids, oiticica oil fatty acids, olive oil fatty acids, palm oil fatty acids, peanut oil fatty acids, soybean oil fatty acids, tung oil fatty acids and a long list of other well-known, commercially available fatty acids. The fatty acids can be added to and reacted with the phenol-aldehyde-alkylene oxide reaction product in such proportions that up to 90 percent of the hydroxyl groups in the etherified resin are condensed by reaction with the fatty acid.

In addition, modification can be accomplished with up to 10 percent by weight based on the weight of the etherified phenol-aldehyde resin of any dibasic acid, dibasic acid anhydride, or dibasic acid ester such as, for example, phthalic, malonic, maleic, fumaric and tereph-thalic acids and anhydrides and esters thereof.

The preparation of the phenol-aldehyde condensation product and the eterification of said phenol-aldehyde with any alkylene oxide follow standard, well-known procedures. The modification of the etherified phenol-aldehyde with either monocarboxylic acids or dibasic acids or their equivalents and mixtures thereof, also follows conventional procedures well known in the art. In general, merely admixing the various reactants in any desired order with heating to reflux in any desired solvent and with concurrent agitation, in an inert atmosphere if desired, will serve to form the desired condensation reaction products.

The organosilicon compounds which are operative herein can be any monomeric organosilanes such as organohalosilanes or organohydrocarbonoxy silanes or silanols or they can be siloxane homopolymers or copolymers which contain residual halogen, hydrocarbonoxy or hydroxyl groups or combinations of such groups. These organosilicon compounds contain an average of from .9 to 3 inclusive monovalent hydrocarbon radicals and/or halogenated monovalent hydrocarbon radicals attached to each silicon atom by C—Si bonds, and an average of from .05 to 3.1 inclusive hydrocarbonoxy, hydroxy and/or halogen groups per silicon atom attached to said silicon atoms.

The organic substituents "R" attached to the silicon atoms can be any monovalent hydrocarbon radical, for example, alkyl radicals such as methyl, ethyl, butyl and octadecyl; alkenyl radicals such as vinyl and allyl; aryl radicals such as phenyl, naphthyl, and xenyl; alicyclic radicals such as cyclopentyl and cyclohexyl; alkaryl radicals such as tolyl and xylyl; and aralkyl radicals such as benzyl, and/or any halogenated hydrocarbon radical such as tetrafluoroethyl, perfluorovinyl, dichlorophenyl, α,α,α-trifluorotolyl and so forth. R can represent any combination of the defined radicals. The hydrocarbonoxy radicals attached to the silicon can be saturated or unsaturated radicals such as methoxy, ethoxy, octadecyloxy, vinyloxy, allyloxy, benzyloxy, cycloaliphatic radicals such as cyclopentoxy and cyclohexoxy and aryloxy radicals such as phenoxy, etc. X can represent any combination of such radicals and/or hydroxy groups and/or halogen atoms.

The organosilicon compounds employed in this invention are well known in the art and methods of preparation are well known and extensively documented in the art.

It is to be clearly understood that the methods employed to prepare either or both the etherified phenolaldehyde whether further modified or not and the silicone-etherified-phenol-aldehyde resins are not critical and any and all means for preparing such resins are contemplated herein. The etherified phenol-aldehyde resin and organosilicon compound can be reacted in any proportions from 1 to 99 percent by weight of said phenol-aldehyde and from 99 to 1 percent by weight of the organosilicon compound.

A wide variety of well-known melamine and/or urea resins can be blended with the resins of this invention to obtain specific characteristics. The materials employed and the proportions used will be entirely dependent upon the ultimate properties sought and will be readily apparent to one skilled in the art.

The various resin compositions disclosed herein can be cured in any desired manner without departing from the scope of this invention. If desired, metallic drying catalysts such as lead and/or cobalt can be employed. The best method of cure is to heat the resinous composition, but air-drying resins are readily obtainable within the scope of this invention.

The resins of this invention have many uses including coating resins, insulation, and as paint and varnish ingredients.

The following examples serve to aid those skilled in the art to better understand this invention. The examples are illustrative and are not to be construed as in any way restricting the scope of this invention. All parts and percentages in the examples are based on weight unless otherwise specified.

*Example 1*

A three neck flask was fitted with an agitator, thermometer, nitrogen feed tube and a condenser modified with a Dean-Stark type water trap. Into the flask 456 parts of the condensation product of a phenol-formaldehyde resin and ethylene oxide and 444 parts of soybean fatty acids were added with 2.22 parts of triphenyl phosphite added to catalyze the reaction and reduce discoloration in the ultimate product. The phenol-formaldehyde employed herein contained an average of 6 phenolic nuclei per molecule and after etherification with ethylene oxide, an average of 6 primary aliphatic hydroxy groups per molecule were present. 456 grams of said resin represents 3 gram equivalents of hydroxyl groups. 40 parts of xylene were added as solvent and for purposes of azeotroping water formed during the reaction. A nitrogen sweep was made and the reaction was carried out under nitrogen atmosphere. The reactants were heated to 220° C. with agitation over 2.3 hours. The reaction mixture was held at 220°–235° C. for 3 hours after which it was cooled and diluted to 70 percent solids in solution with additional xylene. The etherified phenol-formaldehyde resin was filtered and the filtrate had an acid number of .04, a specific gravity of 0.946, viscosity of a 50 percent solids solution was 26.3 cs. at 25° C., a .7 mil film cured in 8 to 10 hours at 150° C., a 1.5 mil film had a flex life of 328 to 341 hours at 150° C.

The etherified phenol-formaldehyde resin prepared above was modified with a silicone resin by adding to a flask fitted as above, 140 parts of said resin solids in 64 parts of xylene to 60 parts of a monophenylsiloxane hydrolyzate containing 6 percent residual hydroxyl groups, in 81 parts of toluene and 55 parts of xylene. The reactants were heated to 150° C. in 1.5 hours and volatiles stripped off. Heating was continued at 149°–150° C. for 3 hours at which point the resin bodied as evidenced by an increase in viscosity. The reaction mixture was cooled and diluted to 40 percent solids in solution with xylene. The resulting resin was hazy but became clear on filtering. An excellent, flexible, hard, tough, clear film having very good color characteristics was formed by casting a film of the resin and curing for 45 minutes at 150° C.

*Example 2*

Employing the equipment and method of Example 1, 456 parts of the etherified phenol-formaldehyde resin of Example 1 was modified with 504 parts of dehydrated castor oil fatty acids with 2.52 parts of triphenyl phosphite as a catalyst and 34 parts xylene as diluent, by heating to 213° C. in 1.5 hours and maintaining the mixture at 213° C. to 229° C. for 3.5 hours. The resulting resin was cooled and diluted to 59 percent solids with toluene. The resin was filtered and a clear resinous product was obtained having an acid number of 0.44 and showing a weight loss of 7.4 percent after 3 hours at 135° C.

170 parts of the resin solution prepared above were added to 190 parts of a 52.6 percent solids in toluene solution of a copolymeric organosiloxane composed of 29.4 mol percent methylphenylsiloxane units, 32.0 mol percent monomethylsiloxane units, 32.6 mol percent monophenylsiloxane units, and 6.0 mol percent diphenylsiloxane units and containing about 4 percnet by weight of residual hydroxyl groups. The mixture of reactants was heated to 140° C. in 40 minutes and 100 parts naphthyl mineral spirits were added slowly while increasing the heat to 175° C. in 46 minutes. Volatiles were removed and the resin cooked at 175° C. for 6 minutes at which point the resin bodied and the desired viscosity was attained. The resin was cooled and diluted to 45.2 percent solids in solution with a mixture containing 2 parts of xylene per each part of methyl isobutyl ketone. The resulting resin exhibited a weight loss of 5.6 percent after 3 hours at 135° C. The resin cured to a film having excellent properties and characteristics by heating at 150° C. for 10 minutes. The silicone modified phenol-formaldehyde resin film had much lighter, clearer and more desirable color characteristics than did the phenol-formaldehyde film prepared in the first step of this example.

*Example 3*

Employing the method of Example 1, 152 parts of the etherified phenol-formaldehyde resin of Example 1 and 168 parts of linseed oil fatty acids and 15 parts xylene were heated to 225° C. in 2 hours and cooked at 225°–237° C. for 1 hour. The resulting etherified phenol-formaldehyde resin was cooled to 130° C. and 155 parts of a methylphenylsiloxane containing 10 percent residual methoxy groups were added. This addition caused the reactant's temperature to drop to 100° C. and further heating raised the temperature to 165° C. in 20 minutes. The reactants were cooked at 165° C. for 30 minutes and thereafter raised to 186° C. over the succeeding 1 hour at which point the resin had bodied and the desired viscosity was obtained. After cooling, 400 parts of xylene and 55 parts of acetonyl acetone were added. The solution was filtered and the filtrate contained 49 percent resin solids in the solution. This resin air-dried within 24 hours to a film exhibiting excellent properties of hardness, color, clarity, toughness, etc.

*Example 4*

Equivalent results are obtained when the condensation product of p-cresol and acetaldehyde, or 3,5-xylenol and furfural, or p-phenyl phenol and glyoxal, or p-sec-octyl phenol and α-hydroxy-adipaldehyde are substituted for the phenol-formaldehyde condensation product of Example 1.

Example 5

Equivalent results are obtained when chlorophenylvinyldimethoxysilane or dimethyldichlorosilane or octadecyltriphenoxysilane are employed in the method of Example 1.

Example 6

Employing the equipment and method of Example 1, 76 parts of the etherified phenol-formaldehyde resin of Example 1 and 136.5 parts of phenylmethyldimethoxysilane were added to 252 parts of butyrolacetone. A clear solution resulted and was heated to 200° C. over 3 hours and 50 minutes. During the succeeding 25 minutes, the reaction mixture was cooked at 200° C. and 44 parts of the phenylmethyldimethoxysilane were distilled over. At this time, te resin bodied and the viscosity reached the desired point. 200 parts of butyrolacetone were added as diluent and a clear resin solution resulted. A film of this resin cured at 150° C. within 1 hour to produce a hard, flexible film having excellent color characteristics. The cured resin film retained its excellent color when heated to 250° C. for 2 hours.

That which is claimed is:

1. A resinous composition of matter consisting essentially of the reaction product of (A) 1 to 99 percent by weight of the condensation product of any low molecular weight phenol-aldehyde resin containing from 3 to 8 phenolic nuclei per molecule and any alkylene oxide and correspondingly (B) 1 to 99 percent by weight of any organosilicon compound of the formula $$R_nSiX_mO_{\frac{4-(m+n)}{2}}$$

wherein R is selected from the group consisting of monovalent hydrocarbon radicals, and halogenated monovalent hydrocarbon radicals, X is selected from the group consisting of monovalent hydrocarbonoxy groups, hydroxyl radicals and halogen atoms, $n$ has an average value of from .9 to 3 inclusive, $m$ has an average value of from .05 to 3.1 inclusive, and the sum $m+n$ does not exceed 4.

2. A resinous composition of matter consisting essentially of the reaction product of (A) 1 to 99 percent by weight of the condensation product of any low molecular weight phenol-aldehyde resin containing from 3 to 8 phenolic nuclei per molecule and any alkylene oxide and a monocarboxylic acid said monocarboxylic acid being present in amount sufficient to react with up to 90 percent of the hydroxyl groups present in the said etherified phenolaldehyde resin, and correspondingly (B) 1 to 99 percent by weight based on the total weight of A and B of an organosilicon compound of the formula $$R_nSiX_mO_{\frac{4-(m+n)}{2}}$$

wherein R is selected from the group consisting of monovalent hydrocarbon radicals, and halogenated monovalent hydrocarbon radicals, X is selected from the group consisting of monovalent hydrocarbonoxy groups, hydroxyl radicals and halogen atoms, $n$ has an average value of from .9 to 3 inclusive, $m$ has an average value of from .05 to 3.1 inclusive, and the sum $m+n$ does not exceed 4.

3. The composition of claim 2 wherein compound (B) is a phenyl siloxane containing silicon-bonded hydroxyl radicals.

4. The composition of claim 2 wherein compound (B) is a phenyl monovalent hydrocarbonoxy silane.

5. The composition of claim 2 wherein compound (B) is a phenyl siloxane containing silicon-bonded monovalent hydrocarbonoxy groups.

References Cited in the file of this patent

UNITED STATES PATENTS

| | | |
|---|---|---|
| 2,258,221 | Rochow | Oct. 7, 1941 |
| 2,672,105 | Clark | Mar. 16, 1954 |
| 2,683,130 | D'Alelio | July 6, 1954 |
| 2,687,396 | McLean | Aug. 24, 1954 |

FOREIGN PATENTS

| | | |
|---|---|---|
| 503,550 | Belgium | June 15, 1951 |

OTHER REFERENCES

PB Report, 97941 Centro Research Lab. Inc., June 25, 1947.